(12) United States Patent
Hiramoto et al.

(10) Patent No.: US 11,698,324 B2
(45) Date of Patent: Jul. 11, 2023

(54) VEHICLE EXCITATION DEVICE

(71) Applicant: Honda Motor Co., Ltd., Tokyo (JP)

(72) Inventors: Shutaro Hiramoto, Tokyo (JP); Susumu Akutsu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 17/667,514

(22) Filed: Feb. 8, 2022

(65) Prior Publication Data

US 2022/0276122 A1    Sep. 1, 2022

(30) Foreign Application Priority Data

Feb. 26, 2021    (JP) ................. 2021-030103

(51) Int. Cl.
*G01M 7/02* (2006.01)
*G01M 7/06* (2006.01)
*G01M 17/04* (2006.01)

(52) U.S. Cl.
CPC ............ *G01M 7/027* (2013.01); *G01M 7/022* (2013.01); *G01M 7/06* (2013.01); *G01M 17/045* (2013.01)

(58) Field of Classification Search
USPC ....................................................... 73/11.08
See application file for complete search history.

(56) References Cited

U.S. PATENT DOCUMENTS

2010/0058851 A1* 3/2010 Lawrence ............... G01L 5/282
                                                                  73/123

FOREIGN PATENT DOCUMENTS

JP            2020218251        10/2020

* cited by examiner

*Primary Examiner* — Eric S. McCall
*Assistant Examiner* — Timothy P Graves
(74) *Attorney, Agent, or Firm* — JCIPRNET

(57) ABSTRACT

The disclosure provides a vehicle excitation advice. The vehicle excitation device that excites a vehicle having a plurality of wheels includes a plurality of excitation machine bodies on which the wheels are placed, respectively. The excitation machine body includes a front shaft and a rear shaft on which the wheels are placed at intervals in the in the front-rear direction of the vehicle, and an actuator (hydraulic actuator) that excites vibration to the wheels by moving at least one of the front shaft and the rear shaft in the front-rear direction. The front shaft is inclined such that the inner end portion of the front shaft in the left-right direction of the vehicle is located closer to the front of the vehicle than the outer end portion of the front shaft in the left-right direction of the vehicle.

4 Claims, 10 Drawing Sheets

VEHICLE EXCITATION DEVICE

CROSS-REFERENCE TO RELATED APPLICATION

This application claims the priority benefits of Japanese application no. 2021-030103, filed on Feb. 26, 2021. The entity of the above-mentioned patent application is here by incorporated by reference herein and made a part of the specialization.

BACKGROUND

Technical Field

The disclosure relates to a vehicle excitation device for exciting vibration to an automobile to inspect whether or not abnormal sound or the like is generated from the automobile.

Description of Related Art

In the past, drivers drove their automobiles on a test driving lane to inspect whether or not there were any problems such as abnormal sounds from the automobile. In this case, however, a large site is required because of the need for a test driving lane. In recent years, a vehicle excitation device for exciting vibration to the automobile to inspect whether or not abnormal sound is generated from the automobile has been attracting attention (see, for example, Patent Literature 1). This vehicle excitation device allows the inspection of automobiles without the need for a large site such as a test driving lane.

RELATED ART

Patent Literature

[Patent Literature 1] International Publication No. 2020/218251

It is desirable for a vehicle excitation device to be able to excite same vibrations as those of a conventional test driving lane to an automobile. In view of the above, it is an object of the disclosure to provide a vehicle excitation device capable of exciting vibration closer to the vibration of a test driving lane to an automobile than before.

SUMMARY

[1] The disclosure provides a vehicle excitation device (for example, vehicle excitation device of the embodiments; same below) that excites a vehicle (for example, vehicle V of the embodiments; same below) including at least a left pair and a right pair of wheels (for example, wheel W of the embodiments; same below). The vehicle excitation device includes: a plurality of excitation machine bodies (for example, excitation machine body 10 of the embodiments; same below) on which the wheels are placed, respectively. The excitation machine body includes: a front shaft (for example, front shaft 16 of the embodiments; same below) and a rear shaft (for example, rear shaft 17 of the embodiments; same below) on which the wheel is place at an interval in a front-rear direction of the vehicle; and an actuator (for example, hydraulic actuator 12 of the embodiments; same below) exciting vibration to the wheel by moving at least one of the front shaft and the rear shaft in the front-rear direction; in which the front shaft is inclined such that an inner end portion of the front shaft in a left-right direction of the vehicle is located close to a front of the vehicle than an outer end portion of the front shaft in the left-right direction of the vehicle.

DESCRIPTION OF THE EMBODIMENTS

Hereinafter, the vehicle excitation device of an embodiment of the disclosure will be described with reference to the drawings. A vehicle excitation device 1 of the present embodiment excites a vehicle V via wheels W (see FIG. 6) in order to inspect the vehicle V (see FIG. 6), and includes four excitation machine bodies 10.

Figure 1:
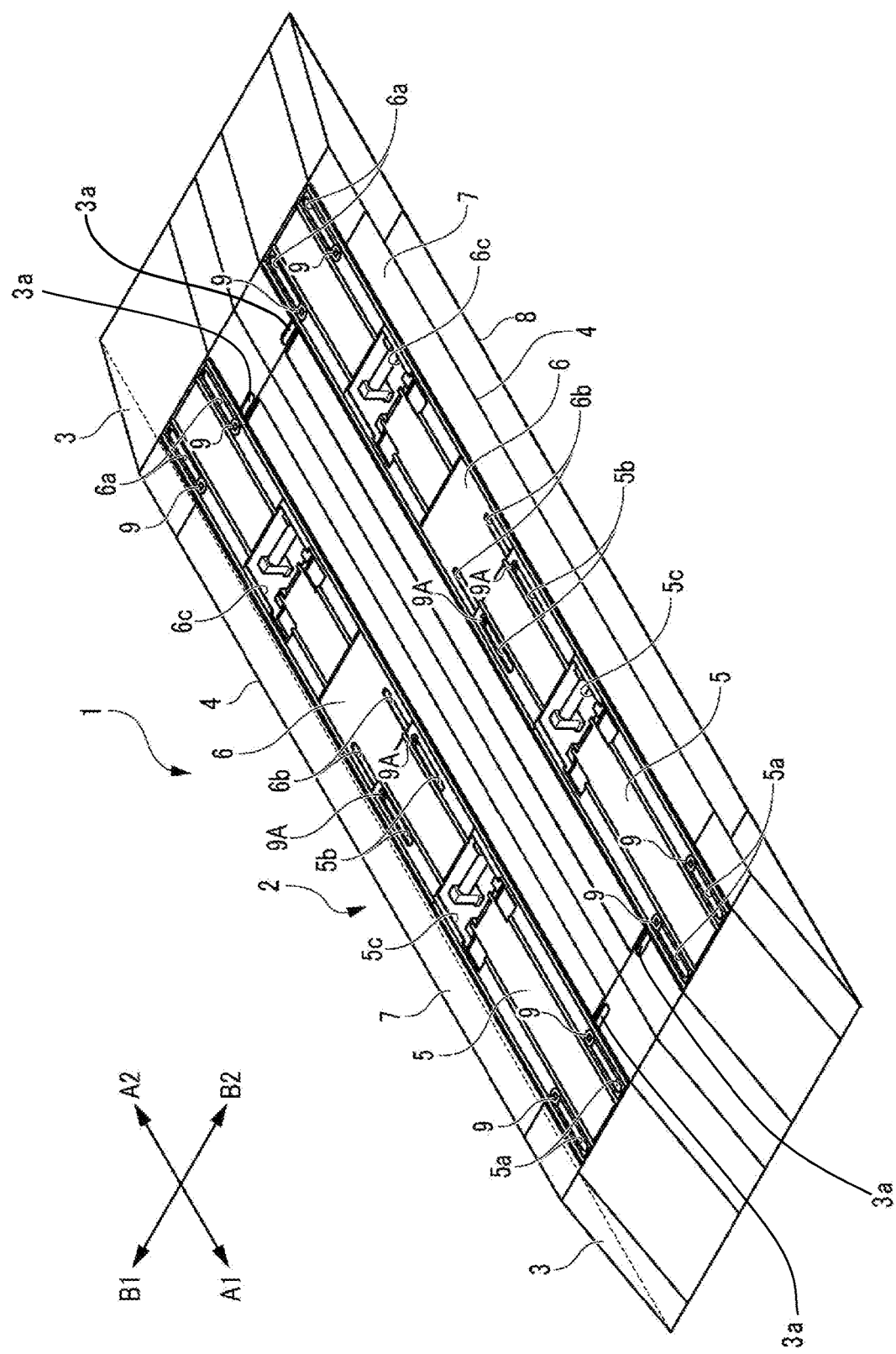
FIG. 1 is an explanatory view showing a vehicle excitation device of an embodiment of the disclosure.

The vehicle excitation device 1, as will be described later, excites the four wheels W in the vehicle V to be inspected by four excitation machine bodies 10, and thereby the vehicle V is inspected for the presence or absence of abnormal sounds, noise, and the like. In the following description, for convenience, A1 side of arrow A1-A2 in FIG. 1 is referred to as "front"; A2 side of arrow A1-A2 is referred to as "rear"; B1 side of arrow B1-B2 is referred to as "right"; B2 side of B1-B2 is referred to as "left"; upper side is referred to as "up"; and lower side is referred to as "down".

Figure 5:
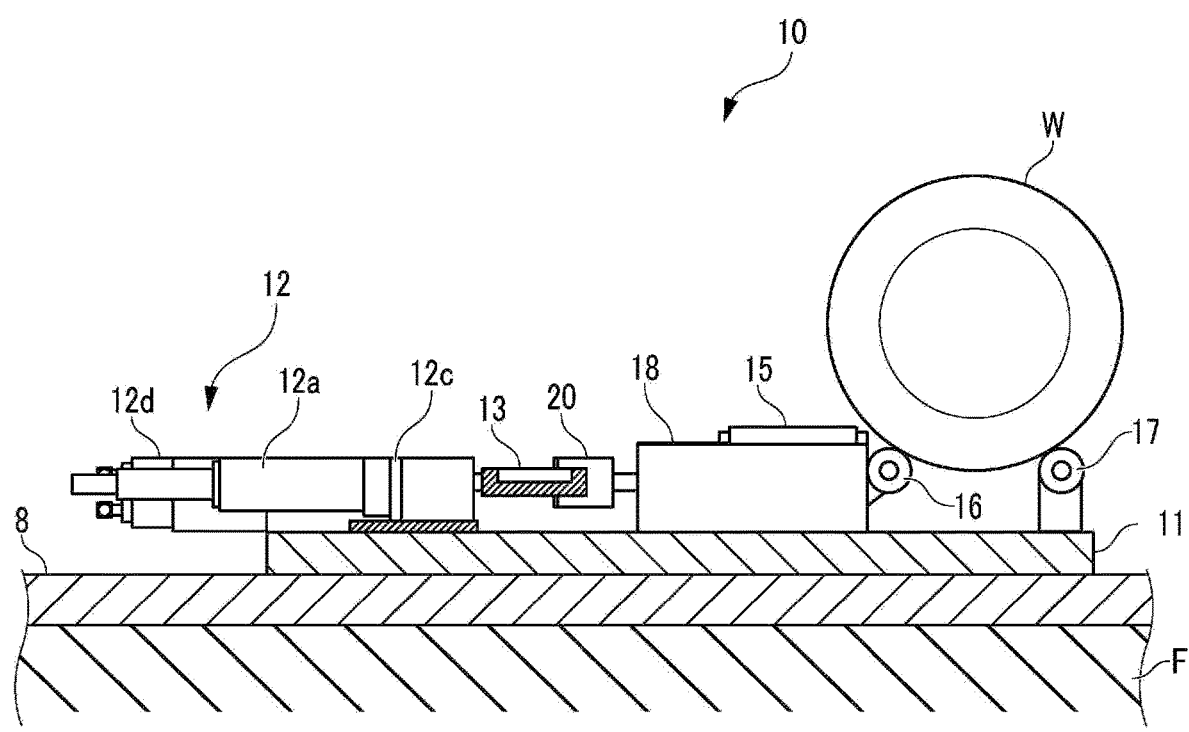
FIG. 5 is a view showing a cross section along line CC of FIG. 4.
Figure 6:
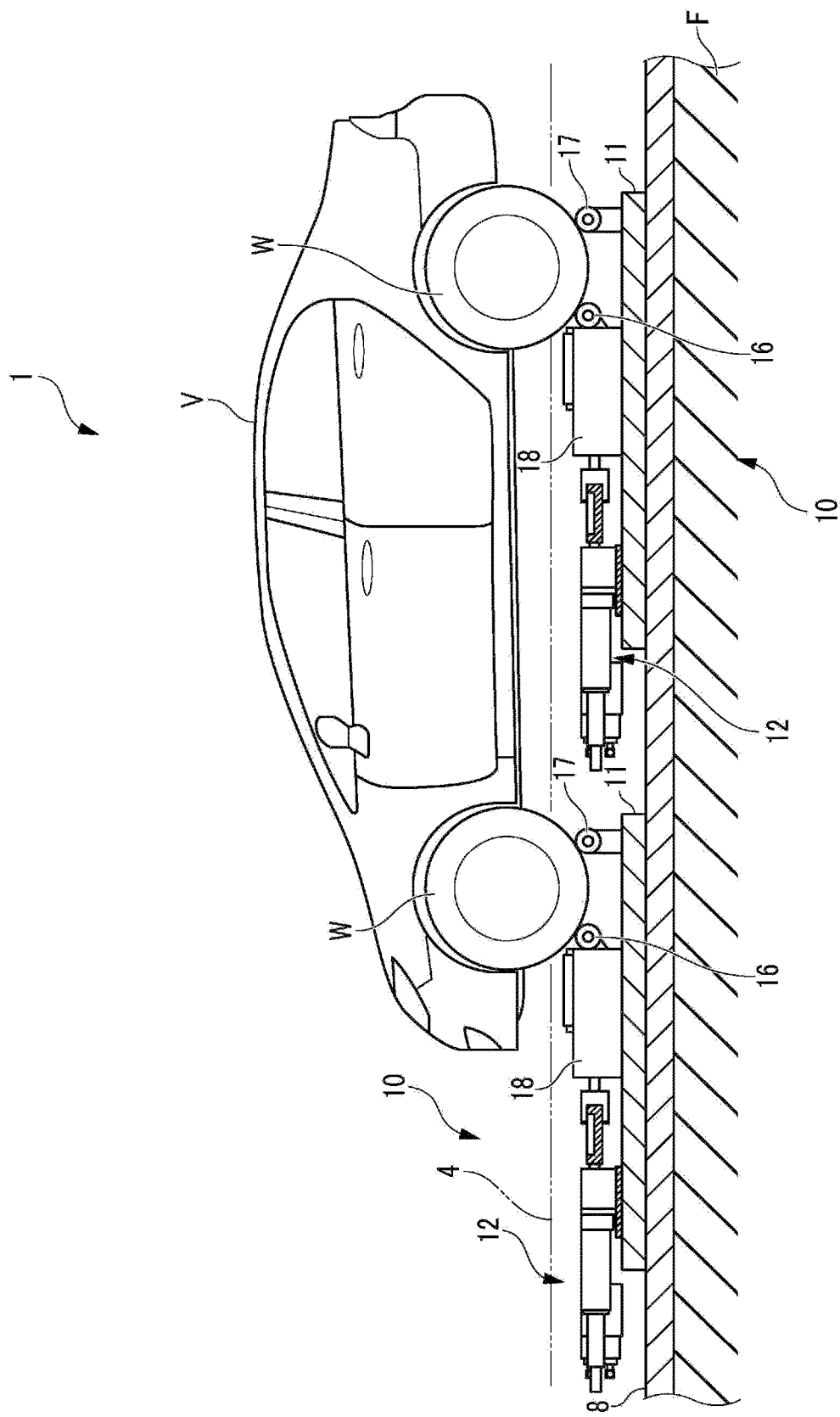
FIG. 6 is a view showing a state in which a vehicle is placed so as to be vibrated in a vehicle excitation device.

The vehicle excitation device 1 is provided with a placement base 2 for placing the vehicle V at the time of inspection, and the placement base 2 is disposed on a floor F (see FIG. 5 and FIG. 6). The left half and the right half of the placement base 2 are symmetrically configured, so the left half will be described below as an example.

The left half of the placement base 2 includes a placement portion 4 extending in the front-rear direction; and front and rear slope portions 3, 3 provided in the front of and rear of the placement portion 4. The surface of the front slope portion 3 includes a flat surface portion whose surface is continuous with a front end of the placement portion 4, and an inclined surface whose surface is continuous with the flat surface portion and which extends diagonally forward and downward.

Further, the surface of the rear slope portion 3 includes a flat surface portion whose surface is continuous with the rear end of the placement portion 4 and an inclined surface whose surface is continuous with the flat surface portion and which extends diagonally rearward and downward. When inspection starts, the vehicle V moves from a floor surface to the placement portion 4 via the rear slope portion 3, and after the inspection is completed, moves from the placement portion 4 to the floor surface via the front slope portion 3.

On the other hand, the placement portion 4 includes front and rear placement plate portions 5, 6; a top plate portion 7; a base plate portion 8; and the like in order from the upper side to the lower side. The base plate portion 8 has a flat plate shape extending in the front-rear direction, and the front and rear end portions thereof are integrally fixed to the front and rear slope portions 3, 3. The base plate portion 8 is placed on the floor surface and is firmly fixed to the floor F via fixtures (for example, anchor bolts) (not shown).

The top plate portion 7 extends in the front-rear direction and is arranged in parallel with the base plate portion 8. Further, the front placement plate portion 5 extends in the front-rear direction, a front end portion thereof is placed on the flat surface portion of the front slope portion 3, and a pair of long holes 5a, 5a are formed at left and rights end portions thereof. The front end portion of the front placement plate portion 5 is fixed to the front slope portion 3 via hydraulic clamp devices 9 at edge portions of the long holes 5a.

Further, the front slope portion 3 is formed with a long hole 3a extending in the left-right direction, and the hydraulic clamp devices 9 sandwich the front placement plate portion 5 and the front slope portion 3 in the up-down direction in a state of being fitted into the long holes 5a of the front placement plate portion 5 and the long hole 3a of the front slope portion 3. As a result, the front placement plate portion 5 is fixed to the front slope portion 3.

An opening 5c is provided in a central portion of the front placement plate portion 5. The opening 5c is formed in a rectangular shape in a plan view and penetrates the front placement plate portion 5 in the up-down direction. An excitation machine body 10 (see FIG. 3) is arranged below the opening 5c, and the details of the excitation machine body 10 will be described later.

Further, long holes 5b, 6b are formed in a rear end portion of the front placement plate portion 5 and a front end portion of the rear placement plate portion 6. Hydraulic clamp devices 9A similar to the hydraulic clamp devices 9 sandwich the front placement plate portion 5 and the rear placement plate portion 6 in a state of being fitted into the long holes 5b, 6b. As a result, the front placement plate portion 5 and the rear placement plate portion 6 are fixed to each other by the hydraulic clamp devices 9A.

With the configuration, in a state where the fixing by the hydraulic clamp devices 9, 9A is released, the front placement plate portion 5 is movable in the front-rear direction relative to the front slope portion 3 by the lengths of the long holes 5a, 5b in the front-rear direction.

On the other hand, a rear end portion of the rear placement plate portion 6 is arranged such that an upper surface thereof is at the same height as an upper surface of the front end portion of the front placement plate portion 5, and is configured to be plane-symmetrical with the front end portion of the front placement plate portion 5. That is, the rear end portion of the rear placement plate portion 6 is placed on the flat surface portion of the rear slope portion 3, and a pair of long holes 6a, 6a are formed at left and right end portions thereof.

Further, the long hole 3a extending in the left-right direction is also formed in the rear slope portion 3, and the hydraulic clamp devices 9 sandwich the rear placement plate portion 6 and the rear slope portion 3 in the up-down direction in a state of being fitted into long holes 6a of the rear placement plate portion 6 and the long hole 3a of the rear slope portion 3. As a result, the rear placement plate portion 6 is fixed to the rear slope portion 3.

Further, an opening 6c is provided in a central portion of the rear placement plate portion 6. The opening 6c is formed in a rectangular shape in a plan view, penetrates the rear placement plate portion 6 in the up-down direction, and is configured to have the same size as the opening 5c of the front placement plate portion 5. Further, the excitation machine body 10 is arranged below the opening 6c.

With the configuration, in a state where the fixing by the hydraulic clamp devices 9, 9A is released, the rear placement plate portion 6 is movable in the front-rear direction relative to the rear slope portion 3 by the lengths of the long holes 6a, 6b in the front-rear direction.

Figure 2:
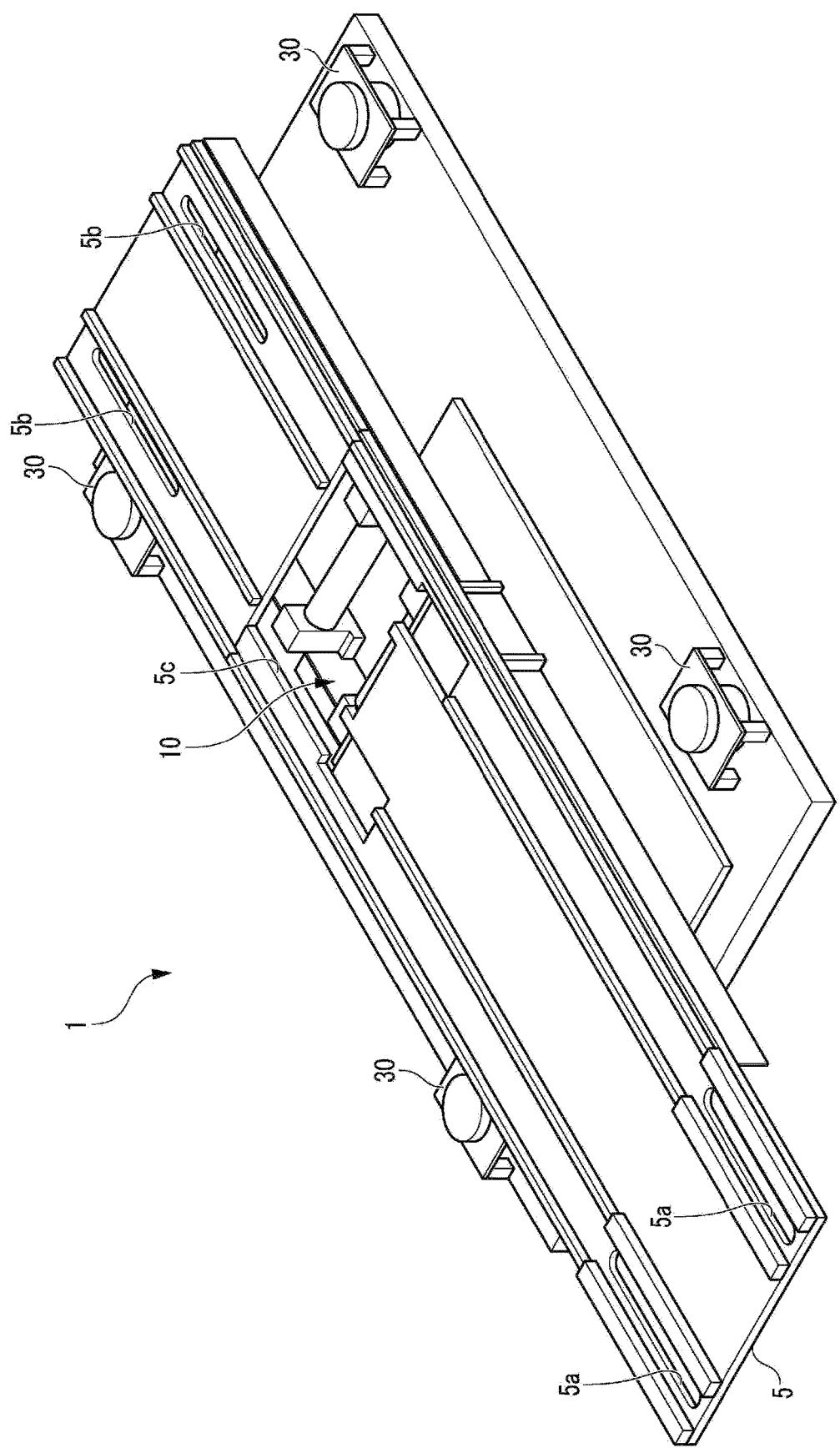
FIG. 2 is a perspective view showing a configuration of a front placement plate portion and an excitation machine body.

Next, the excitation machine body 10 will be described with reference to FIG. 2 to FIG. 7. FIG. 2 shows a configuration in which the top plate portion 7 is omitted for ease of understanding. In the vehicle excitation device 1 of the present embodiment, since the excitation machine body 10 arranged below the opening 5c of the front placement plate portion 5 and the excitation machine body 10 arranged below the opening 6c of the rear placement plate portion 6 are configured in the same manner, hereinafter the excitation machine body 10 arranged below the opening 5c of the front placement plate portion 5 will be described below as an example.

The excitation machine body 10 is provided on a movable base plate 11 having a rectangular shape in a plan view. The movable base plate 11 is fixed to the base plate portion 8 via a magnet clamp (not shown) with a bottom surface thereof in surface contact with an upper surface of the base plate portion 8.

Further, four position changing devices 30 and multiple free bearings (not shown) are provided on the upper surface of the base plate portion 8. The four position changing devices 30 are arranged in a rectangular shape in a plan view, and the movable base plate 11 is provided so as to be surrounded by these position changing devices 30.

Each position changing device 30 includes a plurality of toothed pulleys; a toothed belt wound around the toothed pulleys; and a motor mechanism or the like for driving one toothed pulley (none of which is shown). Two end portions of the toothed belt of each position changing device 30 are connected to four predetermined portions of the movable base plate 11. Further, the multiple free bearings are arranged below the movable base plate 11.

With the configuration, in the state where the fixing by the magnet clamp is released, the movable base plate 11 moves on the base plate portion 8 while rolling the multiple free bearings along with the rotational operation of the toothed pulleys in the four position changing devices 30. That is, the movable base plate 11 is configured such that the position relative to the base plate portion 8 can be changed. Then, the movable base plate 11 is fixed to the base plate portion 8 via the magnet clamp at such a changed position.

Figure 3:
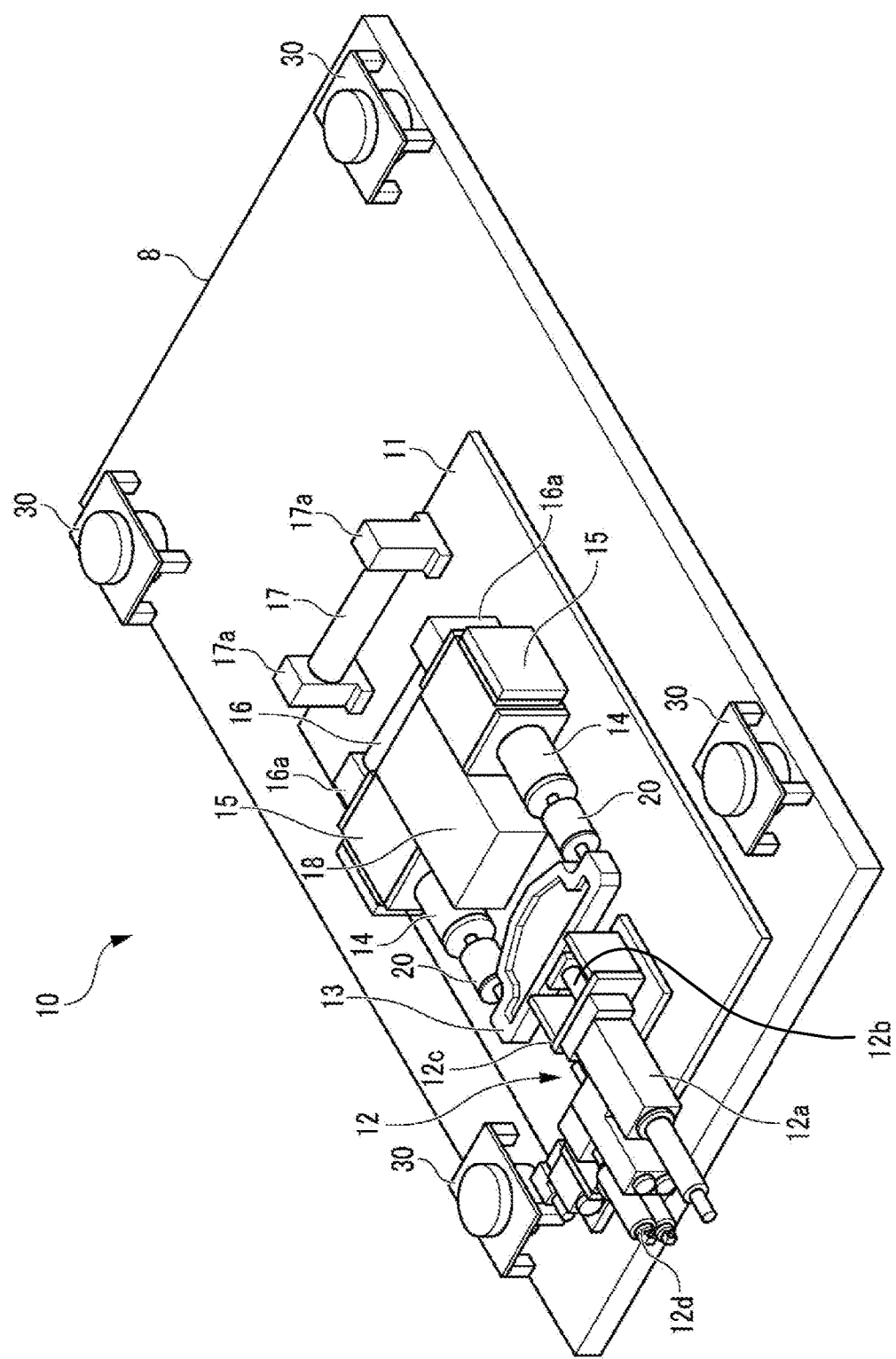
FIG. 3 is a perspective view showing a configuration of an excitation machine body.
Figure 4:
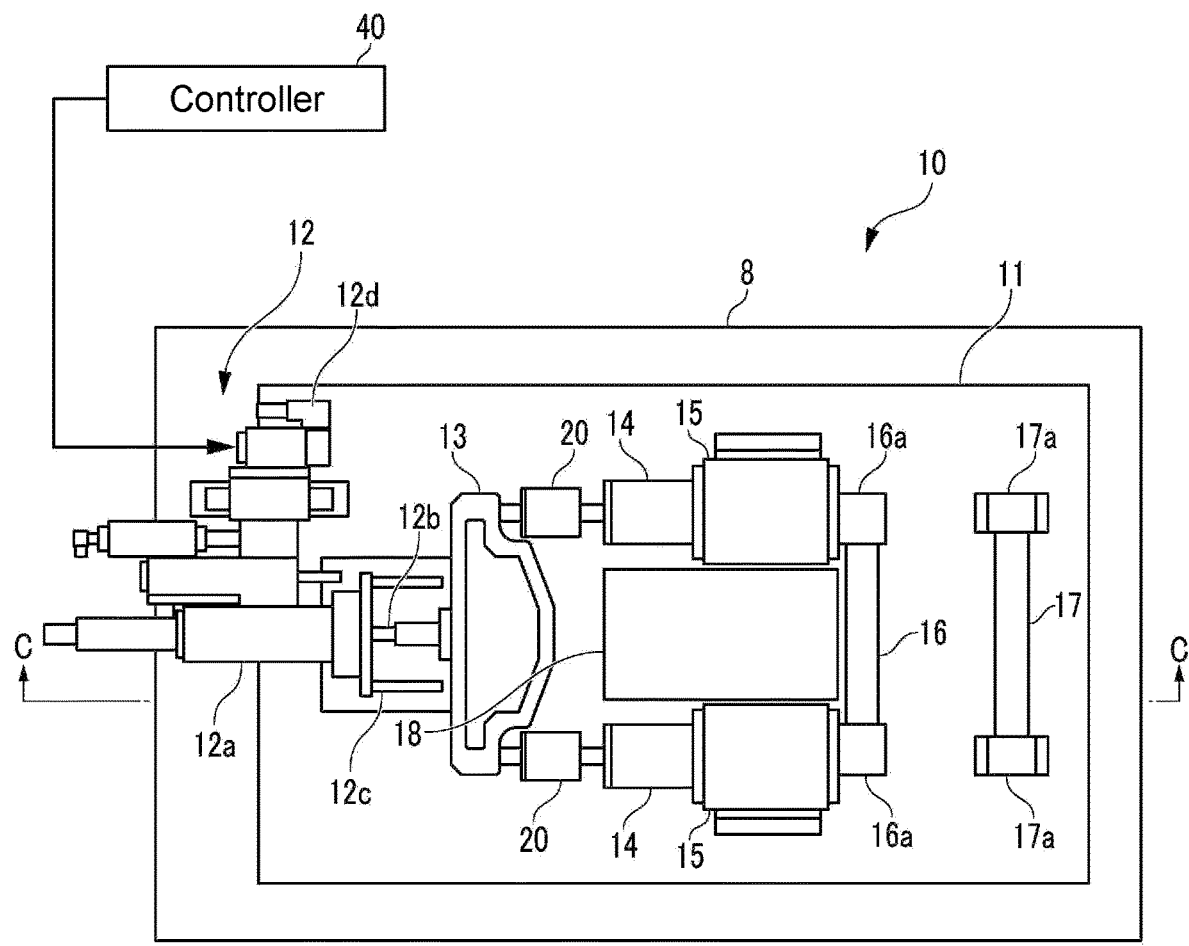
FIG. 4 is a plan view showing a configuration of an excitation machine body.

As shown in FIG. 3 to FIG. 5, the excitation machine body 10 includes a hydraulic actuator 12; an excitation arm 13; two ball joints 20, 20; two excitation shafts 14, 14; two hydrostatic bearings 15, 15; a front shaft 16; a rear shaft 17; a passage base 18, and the like.

In addition, in FIG. 5, hatching of the cross-sectional portions of the front shaft 16 and the rear shaft 17 is omitted for ease of understanding. Further, in the present embodiment, the hydraulic actuator 12 corresponds to an actuator, the excitation arm 13 corresponds to a first power transmission unit, the excitation shaft 14 corresponds to a second power transmission unit, and the front shaft 16 corresponds to an excitation portion.

The hydraulic actuator 12 includes a hydraulic cylinder 12a; a piston rod 12b; a bracket 12c; a hydraulic control circuit mechanism 12d, and the like. The hydraulic cylinder 12a is fixed and supported on the movable base plate 11 and the front placement plate portion 5 via the bracket 12c.

The hydraulic control circuit mechanism 12d is connected to the hydraulic cylinder 12a. By supplying the oil pressure from the hydraulic control circuit mechanism 12d, the hydraulic cylinder 12a drives the piston rod 12b in the front-rear direction.

The hydraulic control circuit mechanism 12d is a combination of an electromagnetic spool valve mechanism and a hydraulic circuit, and the like, and is electrically connected to a controller 40 (control device; see FIG. 4) to be described later. In the hydraulic control circuit mechanism 12d, the hydraulic pressure supplied to the hydraulic cylinder 12a is controlled by controlling the electromagnetic spool valve mechanism by the controller 40. As a result, the moving state and the reciprocating state of the piston rod 12b are controlled, such that the operating state of the front shaft 16 is controlled.

The controller 40 is configured by a microcomputer including a CPU, a RAM, a ROM, an I/O interface (none of which is shown), and the like, and executes an excitation control process.

In this excitation control process, the controller 40 controls the hydraulic pressure supplied from the hydraulic control circuit mechanism 12d to the hydraulic cylinder 12a so as to control the vibration state of the wheel W by the front shaft 16. As a result, the vehicle V is excited via the wheel W, and the presence or absence of abnormal sounds, noise, or the like in the vehicle V is inspected.

The excitation arm 13 is connected to tip portion of the piston rod 12b of the hydraulic actuator 12, thereby the excitation arm 13 is configured to be driven/excited in the front-rear direction via the piston rod 12b.

Left and right end portions of the excitation arm 13 are connected to front end portions of the excitation shafts 14, 14 via the ball joints 20, 20, respectively.

The excitation shafts 14, 14 are arranged at intervals in the left-right direction, and extend parallel to each other in the front-rear direction with a predetermined length. The excitation shafts 14, 14 are rod-shaped members having a circular cross section, and are slidably supported in the front-rear direction by the hydrostatic bearings 15, 15.

Recesses (not shown) are arranged side by side in the front-rear direction at predetermined intervals on an inner peripheral surface of each hydrostatic bearing 15, and the excitation shaft 14 is slidable supported by the hydraulic pressure generated by the recesses. An upper surface of the hydrostatic bearing 15 is fixed to the front placement plate portion 5, and a lower surface is fixed to the movable base plate 11.

Further, bearings 16a, 16a are provided at rear end portions of the excitation shafts 14, 14, respectively. The front shaft 16 extends in the left-right direction at a position at a predetermined height from the upper surface of the movable base plate 11, and two end portions thereof are supported by the bearings 16a, 16a, respectively.

With the configuration, the front shaft 16 is driven by the hydraulic actuator 12 at least between an excitation position (for example, the position shown in FIG. 5) and an extrusion position (not shown). Further, the vibration in the front-rear direction generated by the hydraulic actuator 12 is input to the front shaft 16 via the excitation arm 13 and the excitation shafts 14, 14.

A drive mechanism is built in the front shaft 16 (not shown). The front shaft 16 may be configured to be rotationally driven or freely rotated by the drive mechanism such that it does not cause rotational resistance with respect to the wheel W when the wheel W is excited.

On the other hand, behind the front shaft 16, the rear shaft 17 is provided opposite to the front shaft 16, and the two are parallel to each other. Left and right end portions of the rear shaft 17 are supported by a pair of bearings 17a, 17a, and the bearings 17a, 17a are fixed on the movable base plate 11. The rear shaft 17 may be configured such that the rear shaft 17 rotates in a direction that does not cause rotational resistance with respect to the wheels W when the wheel W is excited.

Further, the passage base 18 is arranged between the hydrostatic bearings 15, 15 on the movable base plate 11, and has a built-in hydraulic actuator (not shown). The passage base 18 is driven by this hydraulic actuator at least in the front-rear direction between a retreat position (for example, the position shown in FIG. 5) and an abutting position (not shown) that abuts the front shaft 16 in the extruded position.

When the passage base 18 moves to the abutting position and abuts the front shaft 16 at the extrusion position, the front shaft 16 is held non-rotatably by the passage base 18. This is because, after the excitation operation is completed, when the wheel W of the vehicle V moves forward while climbing over the front shaft 16, by holding the front shaft 16 in a rotation-stopped state, the driving force of the wheel W is transmitted to the front shaft 16 such that the wheel W can easily move forward. When the drive mechanism (not shown) is built in the front shaft 16, the front shaft 16 is held non-rotatably by the drive mechanism.

The left half of the placement base 2 is configured as described, and the right half of the placement base 2 is similarly configured.

Next, the operation when inspecting the vehicle V in the vehicle excitation device 1 configured as described will be described. First, the hydraulic clamp devices 9, 9A and the magnet clamp are loosened, and two front placement plate portions 5, two rear placement plate portions 6, and four movable base plates 11 are set in a movable state.

Next, the four movable base plates 11 are respectively moved to positions corresponding to the wheelbases and treads of the vehicle V to be inspected by the four position changing devices 30, and then fixed to the base plate portion 8 by magnet clamps. As the movable base plates 11 move, the two front placement plate portions 5 and the two rear placement plate portions 6 move to the positions corresponding to the wheelbases and the treads at the same time as the movable base plates 11. Then, at these positions, the front placement plate portions 5 and the rear placement plate portions 6 are fixed to each other via the hydraulic clamp devices 9A, and at the same time fixed to the front and rear slope portions 3, 3 via the hydraulic clamp devices 9, 9.

Next, the hydraulic actuator 12 in each excitation machine body 10 is driven, and a distance between the rear shaft 17 and the front shaft 16 is set to a value that matches the size of the wheel W of the vehicle V to be inspected. This completes the preparation for inspection.

Next, the vehicle V is moved so as to ride on the placement base 2 from the rear slope portions 3, and as shown in FIG. 6, the four wheels W fit into the openings 5c of the front placement plate portions 5 and the openings 6c of the rear placement plate portions 6 and move downward to be sandwiched by the rear shafts 17 and the front shafts 16 from the front-rear direction.

Figure 7:
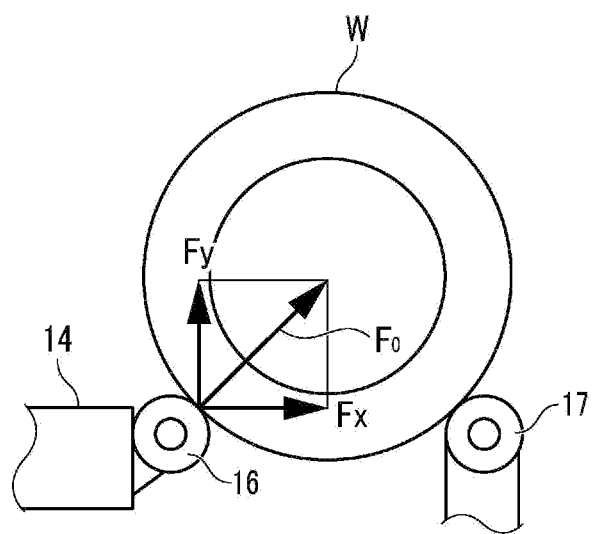
FIG. 7 is an explanatory view showing a pressing force acting on a wheel at the time of excitation and a force component thereof.

In this state, the excitation control process is executed by the controller 40, such that the front shafts 16 are excited by the hydraulic actuators 12 in the front-rear direction, and the wheels W are excited accordingly. During this excitation, when a pressing force Fo of the front shaft 16 acts on the wheel W, as shown in FIG. 7, two component forces Fx, Fy of the pressing force Fo act on the wheel W. That is, by exciting the front shaft 16 in the front-rear direction, the wheel W is simultaneously excited in the front-rear direction and the up-down direction.

Further, the front shaft 16 is configured to be excited by the vibration input in the form of a plurality of periodic functions in the excitation control process. Thus, by shifting phases of the excitations input to the front shafts 16 from each other between the two excitation machine bodies 10, 10 that excite the left and right wheels W, W, the wheels W are also excited in the left-right direction. As described above, with the vehicle excitation device 1 of the present embodiment, taking the front-rear direction as x-axis direction, the up-down direction as y-axis, the left-right direction as z-axis, the wheels W are configured such that they can be excited in three-dimensional direction.

When the excitation operation is executed as described and the inspection of the vehicle V is completed, the front shaft 16 is moved by the hydraulic actuator 12 from an inspection position shown in FIG. 6 to an extrusion position (not shown) closer to the rear shaft 17. At the same time, the passage base 18 is moved by the hydraulic actuator 12 from a retreat position shown in FIG. 6 to the front shaft 16 side. As a result, when the rear end portion of the passage base 18 abuts with the front shaft 16 at the extrusion position, the front shaft is are held in a rotation-stopped state.

In this state, when the vehicle V starts moving forward, the wheel W can easily escape from between the two shafts 16 and 17 while climbing over the front shaft 16 in the rotation-stopped state. As a result, the vehicle V can move forward and get off the placement base 2 via the front slope portions 3.

Further, the front shaft 16 of the present embodiment is inclined such that an inner end portion of the front shaft 16 in the left-right direction of the vehicle V is located closer to the front of the vehicle V than an outer end portion of the front shaft 16 in the left-right direction of the vehicle V. Only the front shafts 16 in contact with the front wheels out of the four wheels W of the vehicle V are inclined in this way. Thus, when the vibration excited onto the wheel W is detected by inclining the front shaft 16 in this way, the vibration characteristic data closest to the vibration when inspected on the test driving lane can be obtained. For the inclination angle, 1.9 degrees to 3.0 degrees was preferable in this test, but since weight and other factors vary depending on the type of the vehicle to be inspected, the inclination angle should be set appropriately according to the type of the vehicle.

As a comparative example, the vibration was detected by inclining the front shaft 16 such that the inner end portion of the front shaft 16 in the left-right direction of the vehicle V is located closer to the rear of the vehicle V than the outer end portion of the front shaft 16 in the left-right direction of the vehicle V, but the vibration characteristic data close to the vibration inspected on the driving lane could not be obtained.

Figure 8:
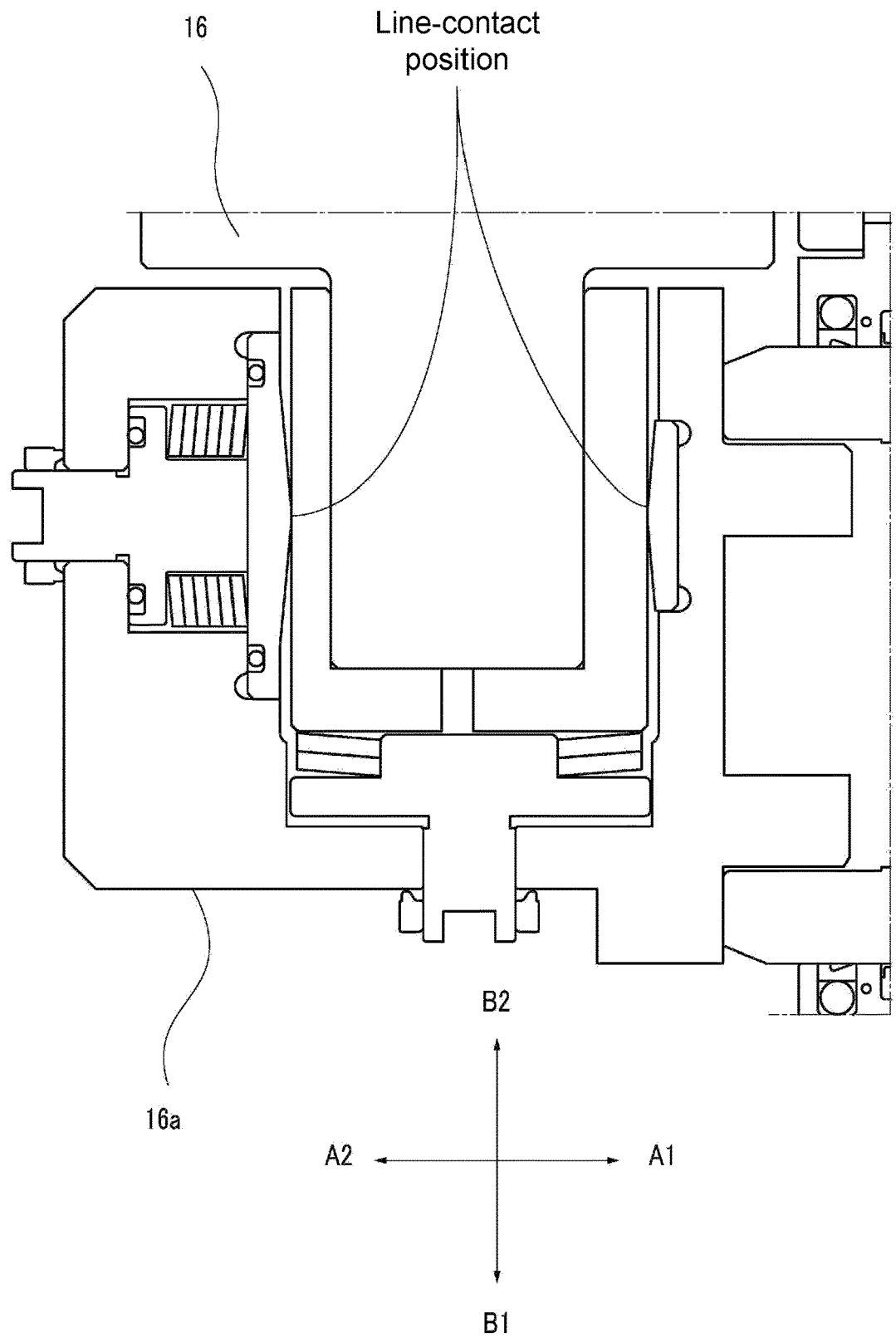
FIG. 8 is an explanatory view showing a bearing of an embodiment in a cross section.

Further, the inclination angle of the front shaft 16 may be finely adjusted. For example, as shown in the cross section in FIG. 8, the bearing 16a that pivotally supports the end portion of the front shaft 16 is configured to be in line contact with the front shaft 16 in the front-rear direction, and by adjusting the placement position of the bearing 16a with respect to the excitation shaft 14 in the front-rear direction by inserting shims or the like, the inclination angle of the front shaft 16 can be finely adjusted.

Figure 9:
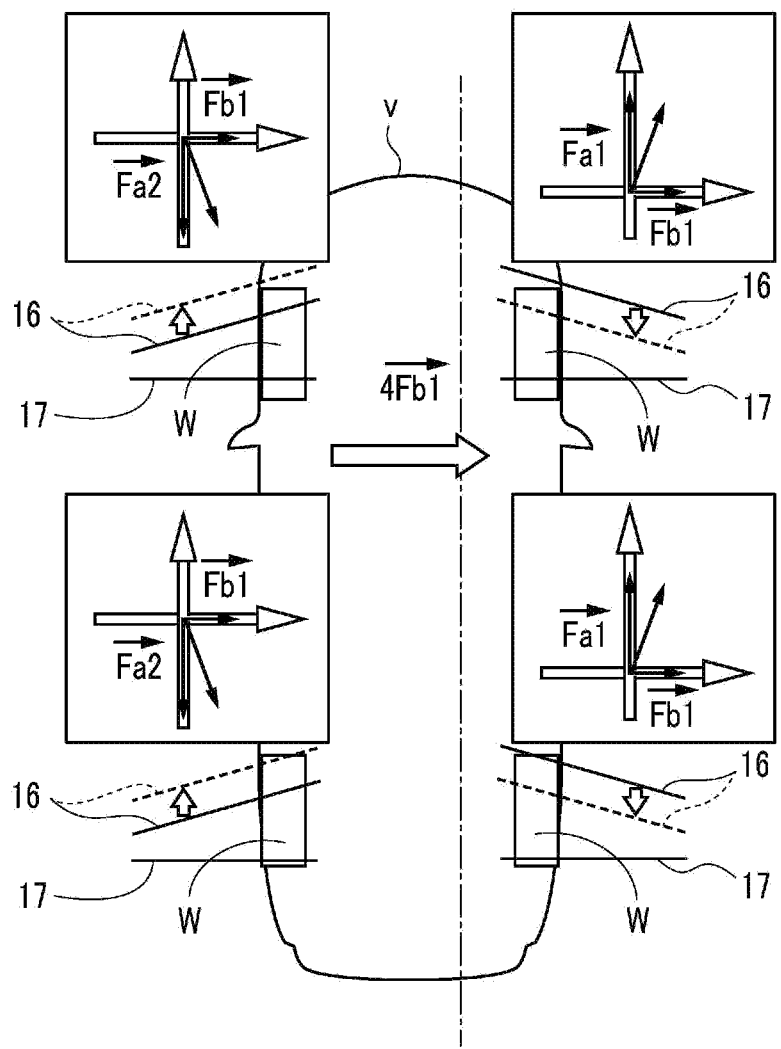
FIG. 9 is an explanatory view showing control when a vehicle is moved to the right by a vehicle excitation device of another embodiment of the disclosure.
Figure 10:
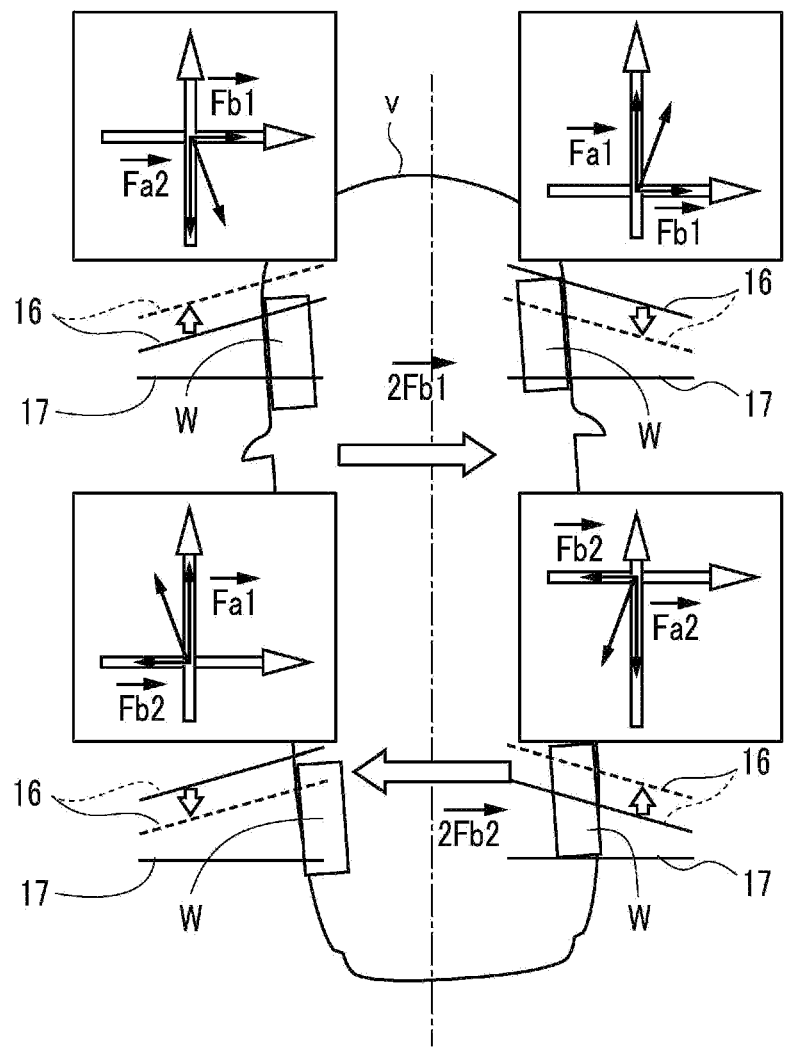
FIG. 10 is an explanatory view showing control when rotating a vehicle of another embodiment.
Figure 10:
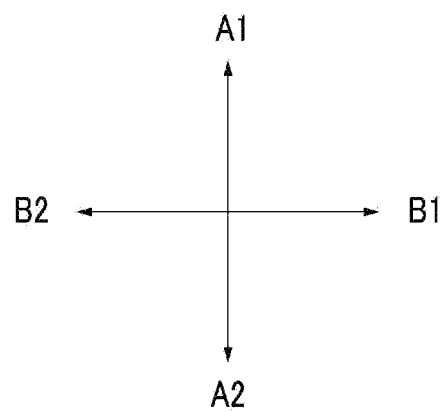

FIG. 9 and FIG. 10 show a vehicle excitation device 1 of another embodiment of the disclosure. In the vehicle excitation device 1 of FIG. 9 and FIG. 10, all the front shafts 16 in contact with the four wheels W of the vehicle V are inclined such that the inner end portions thereof in the left-right direction of the vehicle V are located closer to the front of the vehicle V than the outer end portions thereof in the left-right direction of the vehicle V. Other configurations of the vehicle excitation device 1 of FIG. 9 and FIG. 10 are entirely the same as those of the vehicle excitation device 1 of the embodiments of FIG. 1 to FIG. 8.

With reference to FIG. 9, in the vehicle excitation device 1, when a stop position of the vehicle V is shifted to the left from a center position indicated by an alternate long and short dash line, the front shaft 16 of the right front wheel W is pushed out from an excitation position indicated by a solid line to an extrusion position indicated by a dotted line. At the same time, the front shaft 16 of the left front wheel W is pulled back from the extrusion position indicated by the solid line to the excitation position indicated by the dotted line.

At the same time, the front shaft 16 of the right rear wheel W is pushed out from the excitation position indicated by the solid line to the extrusion position indicated by the dotted line. At the same time, the front shaft 16 of the left rear wheel W is pulled back from the extrusion position indicated by the solid line to the excitation position indicated by the dotted line.

As a result, a force Fb1 to the right is generated on each wheel W, and a total force of 4Fb1 is applied to the vehicle V to move the vehicle V to the right. Therefore, according to the vehicle excitation device 1 of FIG. 9 and FIG. 10, the stop position of the vehicle V can be adjusted by the vehicle excitation device 1 without the driver moving the vehicle V.

With reference to FIG. 10, in this vehicle excitation device 1, when the stop position of the vehicle V is shifted diagonally to the left with respect to a center position indicated by an alternate long and short dash line, the front shaft 16 of the right front wheel W is pulled out from the excitation position indicated by a solid line to an extrusion position indicated by a dotted line. At the same time, the front shaft 16 of the left front wheel W is pulled back from the extrusion position indicated by the solid line to the excitation position indicated by the dotted line.

At the same time, the front shaft 16 of the right rear wheel W is pulled back from the extrusion position indicated by the solid line to the excitation position indicated by the dotted line. At the same time, the front shaft 16 of the left rear wheel W is pushed out from the excitation position indicated by the solid line to the extrusion position indicated by the dotted line.

As a result, a force Fb1 to the right is generated on the left and right front wheels W, and a force Fb2 to the left is generated on the left and right rear wheels W. A clockwise force is applied to the vehicle V, and the vehicle V rotates in the clockwise direction. Therefore, according to the vehicle excitation device 1 of FIG. 9 and FIG. 10, the stop position of the vehicle V can be adjusted by the vehicle excitation device 1 without the driver moving the vehicle V.

In all of the embodiments, the front shaft 16 is described as moving forward and backward, but the relative distance between the front shaft 16 and the rear shaft 17 may change. Therefore, for example, the rear shaft 17 may be configured move forward and backward, or the front shaft 16 and the rear shaft 17 may both be configured to move forward and backward.

According to the disclosure, it is possible to excite the vehicle with vibration that is closer to the vibration of the test driving lane than before.

[2] Further, included in the disclosure is:

a control device (for example, controller 40 of the embodiment; same below) individually controlling the actuator for each of the excitation machine body; in which the wheels include two front wheels (for example, front wheels W of the embodiment; same below) arranged at intervals on left and right of the vehicle and two rear wheels (for example, rear wheels W of the embodiment; same below) arranged at intervals on the left and right of the vehicle at intervals), wherein the control device respectively moves the front shafts corresponding to the front wheel and the rear wheel of one side of a left-right direction of the vehicle forward and respectively moves the front shafts corresponding to the front wheel and the rear wheel of the other side of the left-right direction of the vehicle backward, so as to move the vehicle to the other side of the left-right side of the vehicle.

According to the disclosure, even when the vehicle is displaced to the left or right with respect to the vehicle excitation device, the driver does not need to move the vehicle; by controlling the actuator, the vehicle can be moved such that the vehicle is disposed at an appropriate position in the vehicle excitation device.

[3] Further, included in the disclosure is:

a control device individually controlling the actuator for each excitation machine body, in which the wheels include two front wheels arranged at intervals on left and right of the vehicle and two rear wheels arranged at intervals on the left and right of the vehicle, and the control device respectively moves the front shafts corresponding to the front wheel of one side of the left-right direction of the vehicle and the rear wheel of the other side of the left-right direction of the vehicle forward and respectively moves the front shafts corresponding to the front shaft of the other side of the left-right direction of the vehicle and the rear wheel of one side of the left-right direction of the vehicle backward, so as to rotate the vehicle such that a front of the vehicle moves to the other side of the left-right direction of the vehicle.

According to the disclosure, even when the vehicle is arranged at an angle to the vehicle excitation device, the driver does not need to move the vehicle; by controlling the actuator, the vehicle can be rotated such that the vehicle is disposed at an appropriate position in the vehicle excitation device.

What is claimed is:

1. A vehicle excitation device that excites a vehicle comprising at least a left and a right pair of wheels, the vehicle excitation device comprising:

a plurality of excitation machine bodies on which the wheels are placed, respectively, the excitation machine body comprising:

a front shaft and a rear shaft on which the wheel is placed at an interval thereof in a front-rear direction of the vehicle; and an actuator exciting the wheel by moving at least one of the front shaft and the rear shaft in the front-rear direction;

wherein the front shaft is inclined such that an inner end portion of the front shaft in a left-right direction of the vehicle is located close to a front of the vehicle than an outer end portion of the front shaft in the left-right direction of the vehicle.

2. The vehicle excitation device according to claim 1, comprising:

a control device individually controlling the actuator for each excitation machine body, wherein the wheels comprise two front wheels arranged at intervals on left and right of the vehicle and two rear wheels arranged at intervals on the left and right of the vehicle, and the control device respectively moves the front shafts corresponding to the front wheel and the rear wheel of one side of a left-right direction of the vehicle forward and respectively moves the front shafts corresponding to the front wheel and the rear wheel of the other side of the left-right direction of the vehicle backward, so as to move the vehicle to the other side of the left-right direction of the vehicle.

3. The vehicle excitation device according to claim 1, comprising:

a control device individually controlling the actuator for each excitation machine body, wherein the wheels comprise two front wheels arranged at intervals on left and right of the vehicle and two rear wheels arranged at intervals on the left and right of the vehicle, and the control device respectively moves the front shafts corresponding to the front wheel of one side of a left-right direction of the vehicle and the rear wheel of the other side of the left-right direction of the vehicle forward and respectively moves the front shafts corresponding to the front wheel of the other side of the left-right direction of the vehicle and the rear wheel of one side of the left-right direction of the vehicle backward, so as to rotate the vehicle such that a front of the vehicle moves to the other side of the left-right direction of the vehicle.

4. The vehicle excitation device according to claim 2, comprising:

a control device individually controlling the actuator for each excitation machine body, wherein the wheels comprise two front wheels arranged at intervals on left and right of the vehicle and two rear wheels arranged at intervals on the left and right of the vehicle, and the control device respectively moves the front shafts corresponding to the front wheel of one side of the left-right direction of the vehicle and the rear wheel of the other side of the left-right direction of the vehicle forward and respectively moves the front shafts corresponding to the front wheel of the other side of the left-right direction of the vehicle and the rear wheel of one side of the left-right direction of the vehicle backward, so as to rotate the vehicle such that a front of the vehicle moves to the other side of the left-right direction of the vehicle.

* * * * *